United States Patent
Fanini et al.

(10) Patent No.: US 6,586,939 B1
(45) Date of Patent: Jul. 1, 2003

(54) METHOD AND APPARATUS FOR REDUCING THE EFFECTS OF PARASITIC AND GALVANIC CURRENTS IN A RESISTIVITY MEASURING TOOL

(75) Inventors: Otto N. Fanini, Houston, TX (US); Stanislav W. Forgang, Houston, TX (US); Michael S. Crosskno, Deer Park, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/471,289

(22) Filed: Dec. 24, 1999

(51) Int. Cl.⁷ .............................................. G01V 3/10
(52) U.S. Cl. ...................................................... 324/339
(58) Field of Search ................................ 324/323, 338, 324/339, 340–343, 355, 356, 369, 366, 370

(56) References Cited

U.S. PATENT DOCUMENTS

| | | | |
|---|---|---|---|
| 3,124,742 A | 3/1964 | Schneider | 324/373 |
| 3,808,520 A | 4/1974 | Runge | 324/343 |
| 3,890,563 A * | 6/1975 | Dowling et al. | 324/340 |
| 4,302,722 A | 11/1981 | Gianzero | 324/339 |
| 4,367,647 A | 1/1983 | Barnoud et al. | 73/84 |
| 4,416,494 A | 11/1983 | Watkins et al. | 439/198 |
| 4,471,436 A | 9/1984 | Schaefer et al. | 702/7 |
| 4,514,693 A | 4/1985 | Meador | 324/338 |
| 4,651,101 A | 3/1987 | Barber et al. | 324/339 |
| 4,808,929 A | 2/1989 | Oldigs | 324/339 |
| 4,857,852 A | 8/1989 | Kleinberg et al. | 324/339 |
| 5,065,099 A | 11/1991 | Sinclair et al. | 324/339 |
| 5,343,001 A | 8/1994 | Cowles et al. | 181/102 |
| 5,452,761 A | 9/1995 | Beard et al. | 324/323 |
| 5,708,204 A | 1/1998 | Kasap | 73/152.52 |
| 5,781,436 A | 7/1998 | Forgang et al. | 364/422 |
| 5,869,968 A | 2/1999 | Brooks et al. | 327/61 |
| 5,883,515 A | 3/1999 | Strack et al. | 324/339 |
| 5,999,883 A | 12/1999 | Gupta et al. | 702/7 |
| 6,064,210 A | 5/2000 | Sinclair | 324/369 |
| 6,150,954 A | 11/2000 | Smith | 340/854.6 |

FOREIGN PATENT DOCUMENTS

| | | |
|---|---|---|
| EP | 0289418 B1 | 9/1993 |
| WO | WO 98/00733 | 1/1998 |

OTHER PUBLICATIONS

Wilt et al., "Electromagnet methods for development and production: State of the art," The Leading Edge, (Apr. 1998), pp. 487–491.

Wilt, Digital Cumulative Index, Search Results, The Society of Exploration Geophysicists (Jul. 7, 1999), pp. 1–4.

(List continued on next page.)

*Primary Examiner*—Edward Lefkowitz
*Assistant Examiner*—Reena Aurora
(74) *Attorney, Agent, or Firm*—Madan, Mossman & Sriram, P.C.

(57) ABSTRACT

A transverse induction logging tool having a transmitter and receiver for downhole sampling of formation properties, the tool having a symmetrical shielded split-coil transmitter coil and a bucking coil interposed between the split transmitter coils to reduce coupling of the transmitter time varying magnetic field into the receiver. The tool provides symmetrical shielding of the coils and grounding at either the transmitter or receiver end only to reduce coupling of induced currents into the received signal. The tool provides an insulator between receiver electronics and the conductive receiver housing having contact with conductive wellbore fluid, to reduce parasitic current flowing in a loop formed by the upper housing, feed through pipe, lower housing and wellbore fluid adjacent the probe housing or mandrel. An internal verification loop is provided to track changes in transmitter current in the real and quadrature component of the received data signal. A galvanic electrode is housed in the same mandrel with the induction logging receiver and transmitter.

19 Claims, 13 Drawing Sheets

TILT Dual Transmitter Coil Arrangement

OTHER PUBLICATIONS

Zhou et al., "Reservoir Monitoring With Interwell Electromatnetic Imaging," Chevron (date: unknown), pp. 1–10.

Zhou et. al., A Review of Interwell Electromagnetic Methods for Reservoir Characterization, (date: unknown), pp. 1–8.

Mather et al., "The Transverse Induction Logging Tool (TILT) provides enhanced evaluation results in the Cognac Field, Gulf of Mexico," (May 1999), pp. 1–8.

J. H. Moran & K. S. Kunz, Basic Theory of Induction Logging and Application to Study of Two–Coil Sondes, Geophysics, vol. 27, No. 6, Part 1, pp. 829–858, Society of Exploration Geophysicists, Dec. 1962.

L. A. Tabarovsky & M. I. Epov, "Radial Charateristics of Induction Focusing Probes with Transverse Detectors in an Anisotropic Medium", Nauka, Soviet Geology and Geophysics, 20 (1979), pp.81–90.

* cited by examiner

TILT Dual Transmitter Coil Arrangement

TILT symmetrical shielding

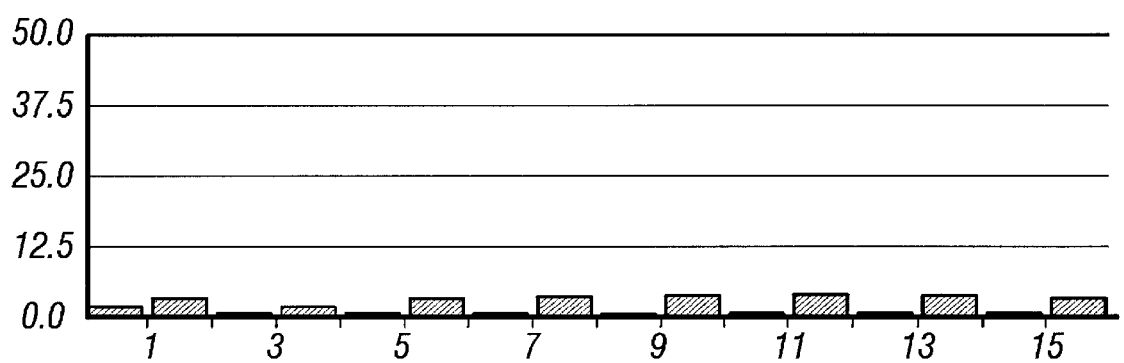
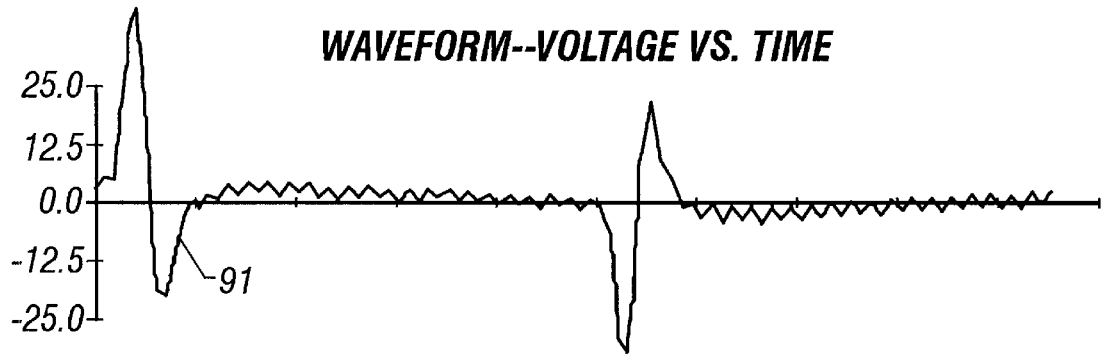
FIG. 7

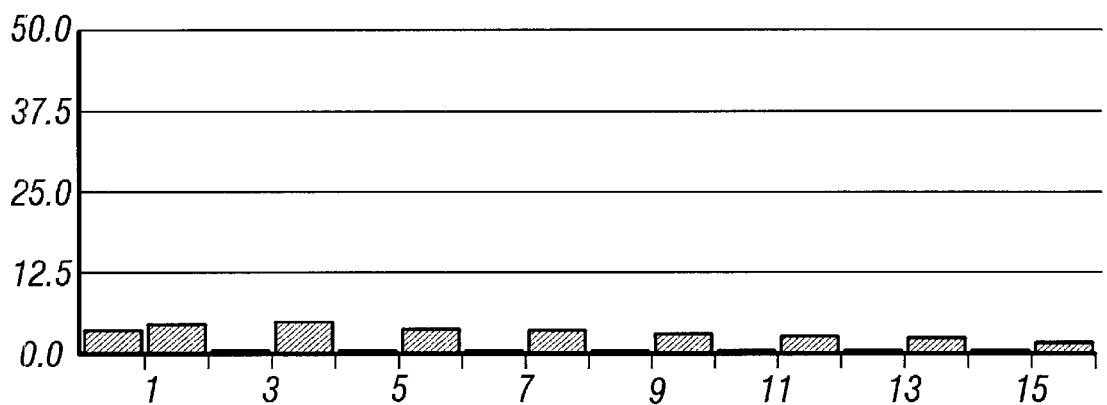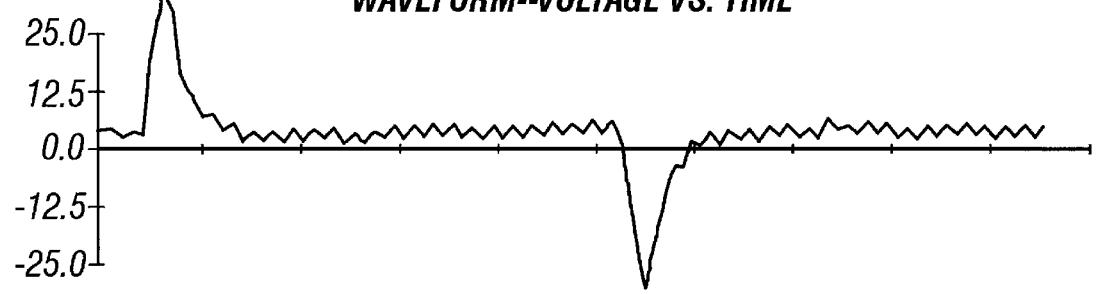
FIG. 8

METHOD AND APPARATUS FOR REDUCING THE EFFECTS OF PARASITIC AND GALVANIC CURRENTS IN A RESISTIVITY MEASURING TOOL

BACKGROUND OF THE INVENTION

1. Field of the Invention

The invention is related generally to the field of electromagnetic induction resistivity well logging instruments wherein the induction antennas are oriented transversely with respect to the longitudinal axis of the instrument. More specifically, the invention is related to an apparatus for transverse electromagnetic induction resistivity well logging operating in the frequency and/or time domain with reduced errors introduced into the acquired logging data.

2. Description of the Related Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829–858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 issued to Barber, in U.S. Pat. No. 5,157,605 issued to Chandler et al and in U.S. Pat. No. 5,600,246 issued to Fanini et al.

The conventional geophysical induction resistivity well logging tool is a probe suitable for lowering into the borehole and it comprises a sensor section containing a transmitter and receiver and other, primarily electrical, equipment for measuring data to infer the physical parameters that characterize the formation. The sensor section, or mandrel, comprises induction transmitters and receivers positioned along the instrument axis, arranged in the order according to particular instrument or tool specifications and oriented parallel with the borehole axis. The electrical equipment generates an electrical voltage to be further applied to a transmitter induction coil, conditions signals coming from receiver induction coils, processes the acquired information, stores or by means of telemetry sending the data to the earth surface through a wire line cable used to lower the tool into the borehole.

In general, when using a conventional induction logging tool with transmitters and receivers (induction coils) oriented only along the borehole axis, the hydrocarbon-bearing zones are difficult to detect when they occur in multi-layered or laminated reservoirs. These reservoirs usually consist of thin alternating layers of shale and sand and, oftentimes, the layers are so thin that due to the insufficient resolution of the conventional logging tool they cannot be detected individually. In this case the average conductivity of the formation is evaluated.

Conventional induction well logging techniques employ coils wound on an insulating mandrel. One or more transmitter coils are energized by an alternating current. The oscillating magnetic field produced by this arrangement results in the induction of currents in the formations which are nearly proportional to the conductivity of the formations. These currents, in turn, contribute to the voltage induced in one or more receiver coils. By selecting only the voltage component which is in phase with the transmitter current, a signal is obtained that is approximately proportional to the formation conductivity. In conventional induction logging apparatus, the basic transmitter coil and receiver coil has axes which are aligned with the longitudinal axis of the well logging device. (For simplicity of explanation, it will be assumed that the bore hole axis is aligned with the axis of the logging device, and that these are both in the vertical direction. Also single coils will subsequently be referred to without regard for focusing coils or the like.) This arrangement tends to induce secondary current loops in the formations that are concentric with the vertically oriented transmitting and receiving coils. The resultant conductivity measurements are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, in a plane parallel to the bedding plane, and the vertical conductivity, in a direction perpendicular to the bedding plane. When there is no bedding dip, horizontal resistivity can be considered to be in the plane perpendicular to the bore hole, and the vertical resistivity in the direction parallel to the bore hole. Conventional induction logging devices, which tend to be sensitive only to the horizontal conductivity of the formations, do not provide a measure of vertical conductivity or of anisotropy. Techniques have been developed to determine formation anisotropy. See, e.g. U.S. Pat. No. 4,302,722. Transverse anisotrophy often occurs such that variations in resistivity occur in the azimuthal direction. Techniques for addressing such full anisotropy are discussed in WO 98/00733.

Thus, in a vertical borehole, a conventional induction logging tool with transmitters and receivers (induction coils) oriented only along the borehole axis responds to the average horizontal conductivity that combines the conductivity of both sand and shale. These average readings are usually dominated by the relatively higher conductivity of the shale layers and exhibit reduced sensitivity to the lower conductivity sand layers where hydrocarbon reserves are produced. To address this problem, loggers have turned to using transverse induction logging tools having magnetic transmitters and receivers (induction coils) oriented transversely with respect to the tool longitudinal axis. Such instruments for transverse induction well logging has been described in PCT Patent publication WO 98/00733 by Bear et al. and U.S. Pat. No. 5,452,761 by Beard et al.; U.S. Pat. No. 5,999,883 by Gupta et al.; and 5,781,436 by Forgang et al.

In the transverse induction logging tools the response of transversal coil arrays is also determined by an average conductivity, however, the relatively lower conductivity of hydrocarbon-bearing sand layers dominates in this estimation. In general, the volume of shale/sand in the formation can be determined from gamma-ray or nuclear well logging measurements. Then a combination of the conventional induction logging tool with transmitters and receivers oriented along the well axis and the transversal induction logging tool can be used for determining the conductivity of individual shale and sand layers.

One, if not the main, difficulties in interpreting the data acquired by a transversal induction logging tool is associated with vulnerability of its response to borehole conditions. Among these conditions is the presence of a conductive well fluid as well as wellbore fluid invasion effects. A known method for reducing these unwanted impacts on the transversal induction logging tool response was disclosed in L. A. Tabarovsky and M. I. Epov, *Geometric and Frequency Focusing in Exploration of Anisotropic Seams*, Nauka, USSR Academy of Science, Siberian Division, Novosibirsk, pp. 67–129 (1972) and L. A. Tabarovsky and M. I. Epov, *Radial Characteristics Of Induction Focusing Probes With Transverse Detectors In An Anisotropic Medium*, Soviet Geology And Geophysics, 20 (1979), pp. 81–90.

The known method has used a transversal induction logging tool comprising a magnetic transmitter and receiver (induction coils). By irradiating a magnetic field the induction transmitter induces currents in the formation adjoining the borehole; in turn, the receivers measure a responding magnetic field due to these currents. To enable a wide range of vertical resolution and effective suppression of the unwanted borehole effects, measurements of magnetic field from the formation can be obtained with different transmitter and receiver spacings that facilitate geometric focusing and different frequencies to facilitate frequency focusing. See, for example U.S. Pat. No. 5,703,772 by Beard. However, even with these modifications, the data logs obtained with a conventional transversal induction logging instrument can be difficult to interpret, that has been exacerbated while logging through a sequence of layers.

In the induction logging instruments the acquired data quality depends on the formation electromagnetic parameter distribution (conductivity) in which the tool induction receivers operate. Thus, in the ideal case, the logging tool measures magnetic signals induced by eddy currents flowing in the formation. Variations in the magnitude and phase of the eddy currents occurring in response to variations in the formation conductivity are reflected as respective variations in the output voltage of receivers. In the conventional induction instruments these receiver induction coil voltages are conditioned and then processed using analog phase sensitive detectors or digitized by digital to analog converters and then processed with signal processing algorithms. The processing allows for determining both receiver voltage amplitude and phase with respect to the induction transmitter current or magnetic field waveform. It has been found convenient for further uphole geophysical interpretation to deliver the processed receiver signal as a vector combination of two voltage components: one being in-phase with transmitter waveform and another out-of-phase, quadrature component. Theoretically, the in-phase coil voltage component amplitude is the more sensitive and noise-free indicator of the formation conductivity.

There are a few hardware margins and software limitations that impact a conventional transversal induction logging tool performance and result in errors appearing in the acquired data.

The general hardware problem is typically associated with an unavoidable electrical field that is irradiated by the tool induction transmitter simultaneously with the desirable magnetic field, and it happens in agreement with Maxwell's equations for the time varying field. The transmitter electrical field interacts with remaining modules of the induction logging tool and with the formation; however, this interaction does not produce any useful information. Indeed, due to the always-existing possibility for this field to be coupled directly into the receiver part of the sensor section through parasitic displacement currents, it introduces the noise. When this coupling occurs, the electrical field develops undesirable electrical potentials at the input of the receiver signal conditioning, primarily across the induction coil receiver, and this voltage becomes an additive noise component to the signal of interest introducing a systematic error to the measurements.

The problem could become even more severe if the induction logging tool operates in wells containing water-based fluids. The water-based mud has a significantly higher electrical permittivity compared to the air or to the oil-based fluid. In the same time, the electrical impedance to the above mentioned displacement currents can be always considered as capacitive coupling between the source—the induction transmitter and the point of coupling. This circumstance apparently would result in a fact that capacitive coupling and associated systematic errors are environment dependant because capacitive impedance will be converse to the well mud permittivity.

The conventional method in reducing this capacitive coupling in the induction logging instrument lays in using special electrical (Faraday) shields wrapped around both transmitter and receiver induction coils. These shields are electrically attached to the transmitter analog ground common point to fix their own electrical potential and to provide returns of the displacement currents back to their source—transmitter instead of coupling to any other place in the tool. However, geometry and layout effectiveness of Faraday shields becomes marginal and contradictory in the high frequency applications where conventional transverse induction tools can operate. These limitations occur due to the attenuation these shields introduce to the magnetic field known in the art as a shield "skin effect". The shield design limitations are unavoidable and, therefore, the possibility for the coupling through displacement currents remains.

Another source of hardware errors introduced into the acquired log data is associated electrical potential difference between different tool conductive parts and, in particular, between transmitter and receiver pressure housings if these modules are spaced apart or galvanically separated. These housings cover respective electronic modules and protect them from exposure to the harsh well environment including high pressure and drilling fluids. Typically, the pressure housing has a solid electrical connection to the common point of the electronic module it covers, however, design options with "galvanically" floating housings also exist. If for some reasons, mainly—imperfections in conventional induction tools—the common points of different electronic modules have an electrical potential difference between them, this difference will appear on the pressure housings. It may occur even in a design with "galvanically" floating housings if the instrument operates at the high frequencies and, in particular, through the capacitive coupling that these metal parts might have to the electronic modules encapsulated in a conductive metallic package.

Having different electrical potentials on separate pressure housings will force the electrical current to flow between them. This current would have a conductive nature and high magnitude if the induction tool is immersed in a conductive well fluid and it will be a displacement current of typically much less magnitude for tool operations in a less conductive or oil-based mud. In both cases this current is time varying, therefore, it produces an associated time varying magnetic field that is environmentally dependent and measured by the induction receiver. For those who are skilled in the art it should be understood that the undesirable influence of those currents on the log data would be significantly higher in the conventional transverse induction tool compared to the instruments having induction coils coaxial with the tool longitudinal axis only. In particular, this is due to the commonly accepted overall design geometry of induction logging tools where transmitter and receiver sections are axially separated by the mandrel. It can be noticed that employing the induction tool in the logging string where it has mechanical and electrical connections (including telemetry) with instruments positioned both above and below could also result in the appearance of the above-mentioned currents.

Another source of the housings' potential offsets is the induction tool transmitter itself. The remaining electrical field that this transmitter irradiates simultaneously with a magnetic field could be different on the surface of separate pressure housings. Severity of this error also depends on Faraday shields' imperfections as described earlier.

There is an additional problem that the potential difference creates in conventional tool layouts having transmitter and receiver electronic modules spaced apart and using interconnection wires running throughout the sensor (mandrel) section. These wires should be electrically and magnetically shielded from induction receiver coils in the sensor section. The entire bundle of wires is placed inside of a highly conductive metal shield that is electrically connected to the common points of separated transmitter and receiver electronic modules. This shield's thickness is selected to enable sufficient suppression of mutual crosstalk between wires and sensor section coils within the entire operational frequency bandwidth and, primarily, at its lower end. In some cases, this shield is a hollow copper pipe with a relatively thick wall.

However, besides protecting the sensor section transmitter and receiver coils and interconnecting wires from mutual crosstalk, this shield simultaneously creates a galvanic path for the currents that could be driven by pressure housings and/or electronic potential difference. This path apparently exists along the shield's external surface. The time varying currents also generate a respective magnetic field that crosses induction receiver coils and induces error voltages. Unfortunately, these error voltages are also environmentally dependent and their changes cannot be sufficiently calibrated out during tool manufacturing. The overall analysis of the potential difference influence demonstrates that in the conductive well fluid, galvanic currents flowing through the fluid along external surface of the induction tool would dominate and, decreasing fluid conductivity redirects these currents to flow along the internal connection between housings. The superposition and magnitude of these galvanic currents strongly depend upon the ambient temperature that pushes the conventional induction tool performance to further deterioration.

Another source of systematic errors introduced in the log data is directly determined by uncertainties in mechanical dimensions of multi-component transmitter and receiver coils in the sensor section related both to their overall dimensions and positions with respect to each other. Thus, to keep required signal phase relationships, conventional tool designs have relied on the mechanical stability and electrical properties of advanced ceramics and plastic materials to build the mandrel. However, even slight physical assembly deviations in the coil wires position and non-uniform coil form material temperature dependencies might destroy a factory pre-set bucking (compensation of the transmitter primary magnetic field coupled in the receiver coil) during well logging, and create non-recoverable errors due to mechanical displacement or imperfections.

Another limitation found in certain induction instrumentation systems is that an insufficient number of signal samples that are gathered for appropriate data stacking. Such data insufficiency occurs due to the necessary measurement "idle time" required for sequentially changing the operational transmitter frequency in a switched frequency tool. It can be demonstrated that by simply switching the transmitter frequency from one frequency to another requires a finite amount of decay time for spurious transient transmitter electronic signals to decay to a sufficiently low level to obtain accurate data measurements. If during this "idle time" the tool continues to take samples or measurements, these measurements will be inaccurate and essentially useless. Therefore, prior receiver designs have provided for "idle time" windows in the measurements during transient decay time, thereby potentially stacking a relatively small and possibly insufficient number of data samples. A better instrumentation design would drastically reduce required idle time. Each of the above-mentioned problems, by itself or a combination with another problem adds to the data error, thereby decreasing the accuracy of the induction downhole tool samples and measurements. Finally, as discussed in the U.S. Pat. No. 3,124,742 by Schneider, galvanic electrodes used in conjunction with induction coils are useful, however, subject to the above mentioned problems.

SUMMARY OF THE INVENTION

It is an object of the present invention to advance the performance of wellbore induction logging tools operating in the frequency and/or time domain. The present invention improves measurement of the formation induction response in the presence of the primary magnetic field generated by a logging tool's transmitter. In a preferred embodiment of the present invention, a structure is provided having a new combination of electrical and mechanical design features which provide structure for high thermal stability coil forms for the tool's induction transmitter and receiver magnetic antenna coils, thereby improving the temperature stability of the antenna coil. The present invention also provides a single coil verification transmitter for in situ verification of the real and phase-shifted quadrature components of data collected by the tool during operation. It is another object of the present invention to provide the tool sensor assembly structure that exhibits improved symmetry in the transmitter and receiver wiring, shielding and input circuitry to minimize systematic errors due to capacitive coupling of electrical field induced by the logging tool's transmitter signal into the tool's receiver circuitry.

It is another object of the present invention to provide electrical grounding and isolation to the receiver and electrically isolate the receiver electronics from the mandrel or housing, or alternatively, provide electrical grounding to the transmitter and let the receiver electronics electrically float to reduce errors caused by potential differences between galvanically separated receiver and transmitter housings in a logging tool. The present invention decreases the influence of electrical field errors by providing floating electronics driving transmitter coils and high-speed differential amplifiers in the receiver signal conditioning circuitry. Employing this combination enables a high rejection of the parasitic signal introduced as the common mode voltage at the receiver input. It is another object of the present invention to provide a sweep oscillator to obtain the primary transmitter magnetic field waveforms for continuous formation response sampling necessary rate sufficient for appropriate data stacking.

In one aspect of the invention, a logging tool is provided for measuring the properties of a geological formation adjacent to a borehole comprising a transmitter comprising at least one coil for inducing eddy currents in the formation; a receiver comprising at least one coil; and an analog ground connection to at least one of the transmitter, and, the receiver for reducing a galvanic current flow between the transmitter and the receiver. In another aspect of the invention a logging tool is provided further comprising an insulator for insulating the receiver from electrical contact with the housing and thus the bore hole. In another aspect of the invention a logging tool is provided further comprising insulating material adjoining the receiver. In another aspect of the invention a logging tool is provided further comprising a feed through pipe having an insulator between the feed through pipe and the receiver. In another aspect of the invention a logging tool is provided further comprising an analog ground connection isolated from a housing for at least one of the transmitter, and, the receiver. In another aspect of the invention a logging tool is provided further comprising an oscillator having a transmitted signal frequency swept over a frequency range. In another aspect of the invention a logging tool is provided further comprising a split-coil transmitter having bucking coil interposed between the split transmitter coils. In another aspect of the invention a logging tool is provided further comprising a split-coil transmitter comprising symmetrical coils. In another aspect of the invention a logging tool is provided further comprising a split-coil transmitter symmetrical shield. In another aspect of the invention a logging tool is provided further comprising a bucking coil shield. In another aspect of the invention a logging tool is provided further comprising a verification winding for coupling a verification signal into the receiver coil. In another aspect of the invention a logging tool is provided further comprising a controllable phase shifting element in the verification check winding to couple a controllable phase shifted and or quadrature verification signal into the receiver coil. In another aspect of the present invention a galvanic electrode and current source are housed in the same mandrel with the induction receiver and transmitter for complementary formation resistivity measurement and interpretation.

BRIEF DESCRIPTION OF THE DRAWINGS

FIG. 7 is a schematic diagram illustrating a waveform response of a conventional oscillator provided by the present invention.

FIG. 8 is a schematic diagram illustrating a waveform response of the sweep oscillator provided by the present invention.

DETAILED DESCRIPTION OF A PREFERRED EMBODIMENT

The present induction well logging tool, useful during monitoring while drilling, logging while drilling and wireline applications, comprises a primary magnetic field transmitter, a receiver of the magnetic field induced by eddy currents in the investigated formation, a data acquisition and control system to manage the inductive logging tool's electronics operations, and to collect and process data. A transmitter incorporates an oscillator, a power amplifier driven by the oscillator and a transmitting antenna. The receiver electronics comprise an induction antenna and input amplifier connected in series. Such downhole tool applications employ induction coils for both receiver and transmitter antennas.

The instrument structure provided by the present invention enables increased stability and accuracy in an induction wellbore logging tool and its operational capabilities, which, in turn, results in better quality and utility of wellbore data acquired during logging. The features of the present invention are applicable to improve the structure of a majority of known induction tools, those for example, designed and developed by Baker Atlas of Houston, Tex. These induction tools include Baker Atlas induction tool model numbers 1507, 1515 and 1520.

The induction logging tool modules inherently manifest a stray capacitance. Stray capacitive coupling between the source of a time varying electric field and a receiver arrangement creates significant systematic errors depending on the adjoining tool environment and temperature. The source of the time varying electric field includes the entire set of transmitter coils and cables connecting these transmitter coils to the respective driving transmitter electronics. The receiver arrangement typically consists of a set of receiver coils and cables connecting these coils to signal conditioning amplifiers.

Figure 4:
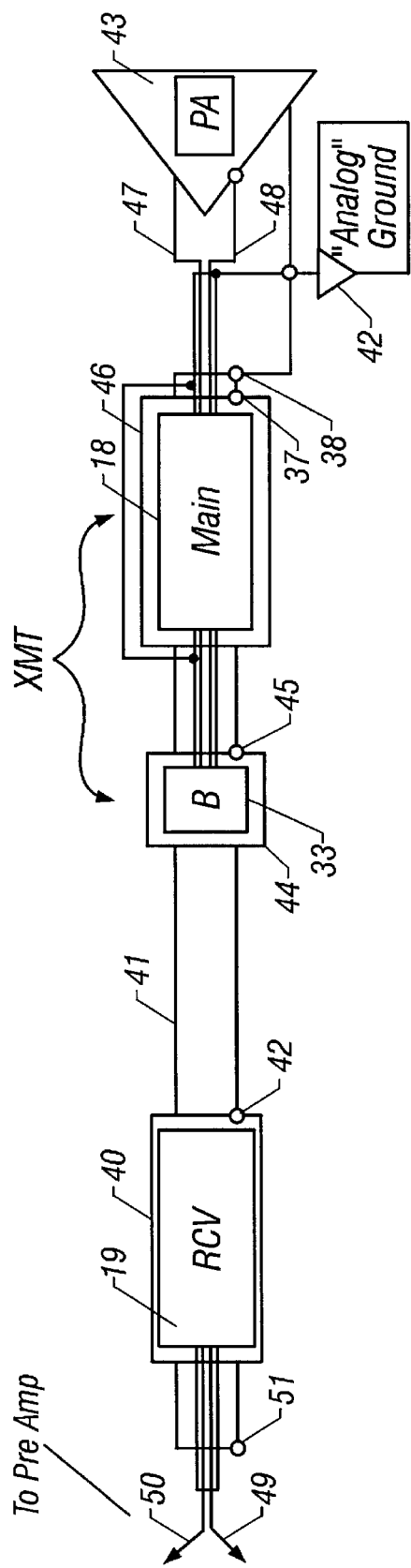
FIG. 4 is a schematic diagram illustrating a preferred embodiment of the shielding and electrical grounding provided by the present invention.

The apparatus of the present invention provides a solution to the stray capacitance coupling problem. The preferred structure comprises a symmetrically shielded split coil transmitter and a bucking coil. In a preferred embodiment, the apparatus of the present invention provides a three axis three-coil array structure wherein the main transmitter coil comprises two symmetrical coils wound on a single coil form and a bucking coil electrically connected between them. The apparatus of the present invention also provides a structure for symmetrically shielding the transmitter array, which maximally cancels displacement currents induced in the shield and enables minimization of the current return. In a preferred embodiment, the symmetrical shield comprises a feed through pipe as shown in FIG. 4.

Conventional applications have utilized asymmetrical induction coil arrays. Such asymmetrical induction coil arrays result in the necessity of asymmetrical shielding configurations that tend to create significant current returns in the transmitter driving source coil, wiring and circuitry. In conventional tool designs, this current returns in the transmitter braid wires in the tool electronics and in the feed through pipes used to carrying interconnecting wires through the tool.

The present invention solves problems encountered in conventional tools. Typically, conventional induction tools with feed through capabilities suffer from two major problems referred to as the "galvanic" driven interference problem and the "induction" driven interference problem. The galvanic problem is caused by a potential difference between the tool upper transmitter housing and the tool lower receiver housing. The potential difference between the transmitter and receiver housings is the result of multiple causes within the tool. Such causes, include, for example, the difference in electrical ground potentials between housings; upper and lower housings coupling through the power transformers connected to the common AC source; capacitive coupling between the electronic switching transmitter power supply and the coil driving amplifiers in the pressure housing and unshielded electrical field irradiated by transmitter coils.

When a conventional tool operates in a conductive adjoining environment (i.e., borehole fluid), the potential difference between the transmitter and receiver housings creates a current flowing between the transmitter and receiver housings. The current flows in the borehole fluid in close proximity to the mandrel sensor section sleeve containing the receiver and transmitter coils. This induced current exhibits both the frequency and phase of the transmitter coil voltage, thus, the induced current generates a magnetic field inducing error voltage in the receiver coil which will be in-phase with transmitter primary magnetic field and the receiver signal to be measured. This type of error can be difficult to discriminate and remove once it has combined with the received signal.

One may reduce this induced in-phase error by using heavy, low impedance feed through pipe connections between metal housings with sufficient shielding of the feed through system communication wires. Even though this solution is somewhat effective, it's problematic, due to coil construction diameters versus tool diameter and because of the "induction" interference problem, discussed below. The induction problem exists in induction instruments where the upper and lower transmitter and receiver housings are connected by such a low impedance wire or feed through pipe during tool operations in the conductive borehole. In the borehole filled with conductive fluid the magnetic field of transmitter coils induces currents flowing in a conductive parasitic loop as follows: upper housing—feed through pipe—lower housing—conductive fluid and back to the upper housing. This parasitic current loop, in turn, induces high error voltages in the receiver coil. This parasitic current loop occurs due to a complex inductive coupling between the receiver input coil, the parasitic loop and feed through pipe.

This "induction" problem is the most severe for transverse magnetic measurements and is less severe in coaxial measurements. Experiments show that in some conductive boreholes the errors can reach up to thirty percent (30%) and more in arrays measuring transverse or radial magnetic field components. The present invention provides a solution to the induction problem by providing an apparatus having an electrically insulator or opening to create an interruption in the conductive parasitic loop. The insulator or opening interrupts the induced current flowing in the parasitic conductive loop. The parasitic conductive loop is interrupted or opened by introducing a high impedance separation, a highly-resistive or an insulator material between the receiver electronics chassis and the receiver mandrel housing which is in contact with a conductive external borehole fluid. The parasitic inductive loop may also be interrupted by insertion of an insulator between the feed through pipe and the receiver electronics. The insulator separates the feed through pipe from the receiver electronics thereby interrupting the parasitic inductive current loop.

The "galvanic" problem is partially attributable to the difference in ground potential. Ground potential difference is substantially reduced by the structure of the present invention by electrical grounding only end of the tool electronics and leaving the other end floating, that is, grounding only either the receiver electronics or the transmitter electronics in the tool. In a preferred embodiment the receiver end of the tool is floating since the receiver is the most noise sensitive element in the tool. In an alternative embodiment, both ends are floating. In a preferred embodiment, the transmitter, receiver and galvanic electrodes are electrically isolated from each other.

Prior systems have provided for frequency dependent electrical isolation in the transmitter section through use of a capacitor. See, for example, U.S. Pat. No. 5,452,761 by Beard et al. The capacitor solution, however, sacrifices shielding at lower transmitter frequencies and enables induction errors, discussed above, at higher frequencies. Moreover, the capacitor solution assumes that higher frequency information is less important for overall tool performance. As it turns out, this assumption is not valid in the transverse induction logging tools because of the radial coil array configurations utilizing higher frequencies having greater susceptibility to this effect and the technical requirements for dual frequency measurements which render the conventional capacitor solution inadequate. The present invention provides a novel solution to eliminate the problem without sacrificing higher frequency content. In the present invention, symmetrical coils and shielding reduce the effect of high frequency components which eliminate the need for the capacitor for "shorting" to ground of high frequency signals.

The receiver/feed through pipe separation or insulator, is connected in close proximity to the receiver signal conditioning amplifiers, at the most noise sensitive section of the measuring tool. Galvanically and electrically insulating the feed through pipe from the receiver electronics section enables interruption of induced currents and enables successful suppression of these errors. In a preferred embodiment, the separation impedance between the receiver section and the outer borehole environment is preferably a minimum of 10 kOhms in the usual operating frequency range. There are however, a wide range of impedances which can be controlled and selected to minimize currents and errors in accordance with specific operating frequencies and conditions.

Figure 1:
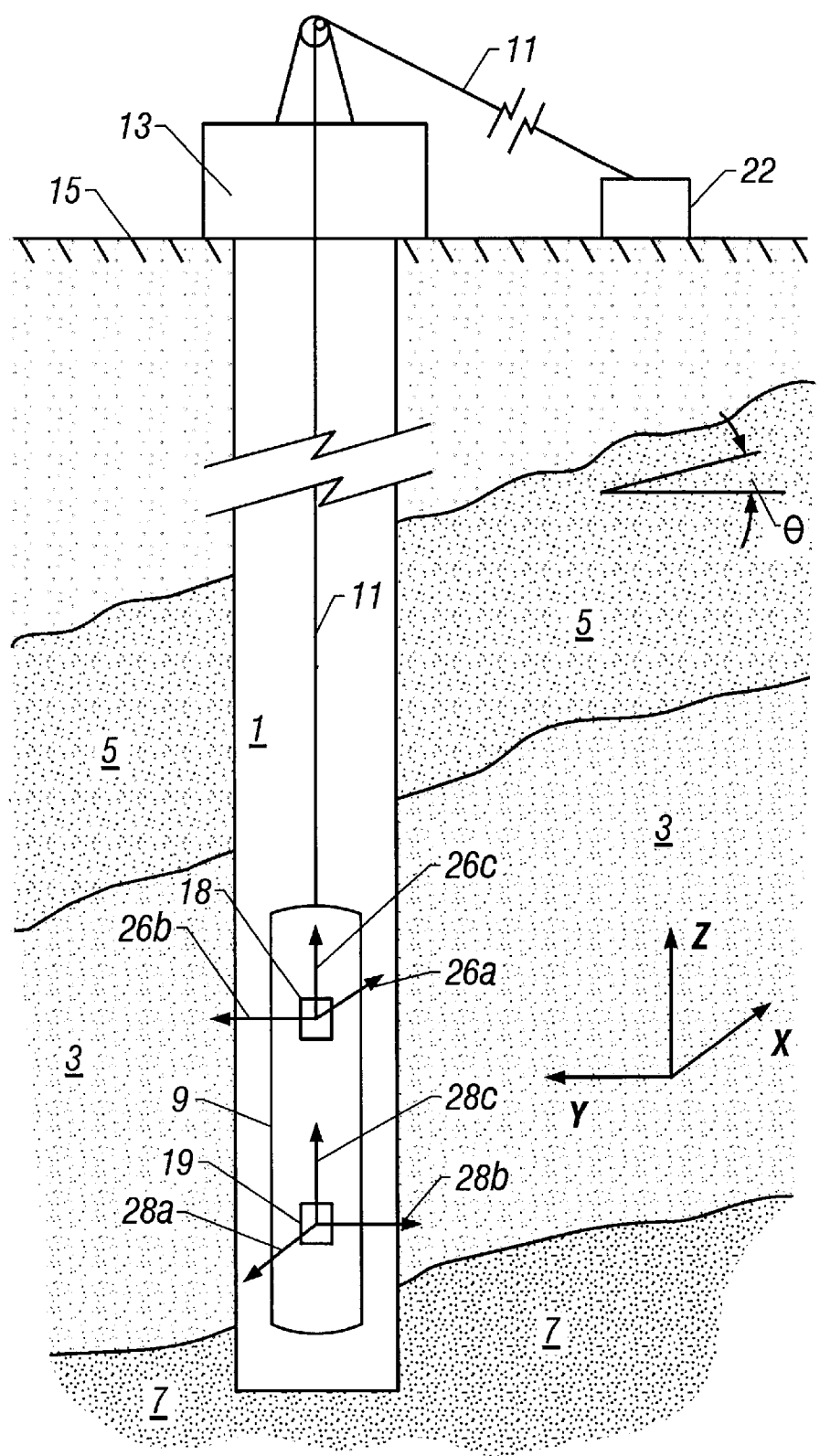
FIG. 1 shows schematically a wellbore extending into a laminated earth formation, into which wellbore an induction logging tool as used according to the invention has been lowered.

The invention will now be described in more detail and by way of example with reference to the accompanying drawings. FIG. 1 schematically shows a wellbore 1 extending into a laminated earth formation, into which wellbore an induction logging tool as used according to the present invention has been lowered. The wellbore in FIG. 1 extends into an earth formation which includes a hydrocarbon-bearing sand layer 3 located between an upper shale layer 5 and a higher conductivity than the hydrocarbon bearing sand layer 3. An induction logging tool 9 used in the practice of the invention has been lowered into the wellbore 1 via a wire line 11 extending through a blowout preventor 13 (shown schematically) located at the earth surface 15. The surface equipment 22 includes an electric power supply to provide electric power to the set of coils 18 and a signal processor to receive and process electric signals from the receiver coils 19. Alternatively, the power supply and/or signal processors are located in the logging tool.

The relative orientation of the wellbore 1 and the logging tool 9 with respect to the layers 3, 5, 7 is determined by two angles, one of which θ as shown in the FIG. 1. For determination of these angles, see, for example U.S. Pat. No. 5,999,883 by Gupta, et al. The logging tool 9 is provided with a set of transmitter coils 18 and a set of receiver coils 19, each set of coils 18, 19 being connected to surface equipment 22 via suitable conductors (not shown) extending along the wire line 11.

Each set of coils 18 and 19 includes three coils (not shown), which are arranged such that the set has three magnetic dipole moments in mutually orthogonal directions, that is, in x, y and z directions. The three-coil transmitter coil set transmits $T_x$, $T_y$, and $T_z$. The receiver coil receives $R_x$, $R_y$ and $R_z$ plus the cross components, $R_{xy}$, $R_{xz}$ and $R_{zy}$. Thus, coil set 18 has magnetic dipole moments 26a, 26b, 26c, and coil set 19 has magnetic dipole moments 28a, 28b, 28c. In a preferred embodiment the transmitter coil set 18 is electrically isolated from the receiver coil set 19. In an alternative embodiment, each coil in transmitter coil set 18 electrically isolated from each other and each coil in receiver coil set 19 electrically isolated from each other. The coils with magnetic dipole moments 26a and 28a are transverse coils, that is they are oriented so that the magnetic dipole moments are oriented perpendicular to the wellbore axis, whereby the direction of magnetic dipole moment 28a is opposite to the direction of magnetic dipole moment 26a. Furthermore the sets of coils 18 and 19 are positioned substantially along the longitudinal axis of the logging tool 9.

Figure 2:
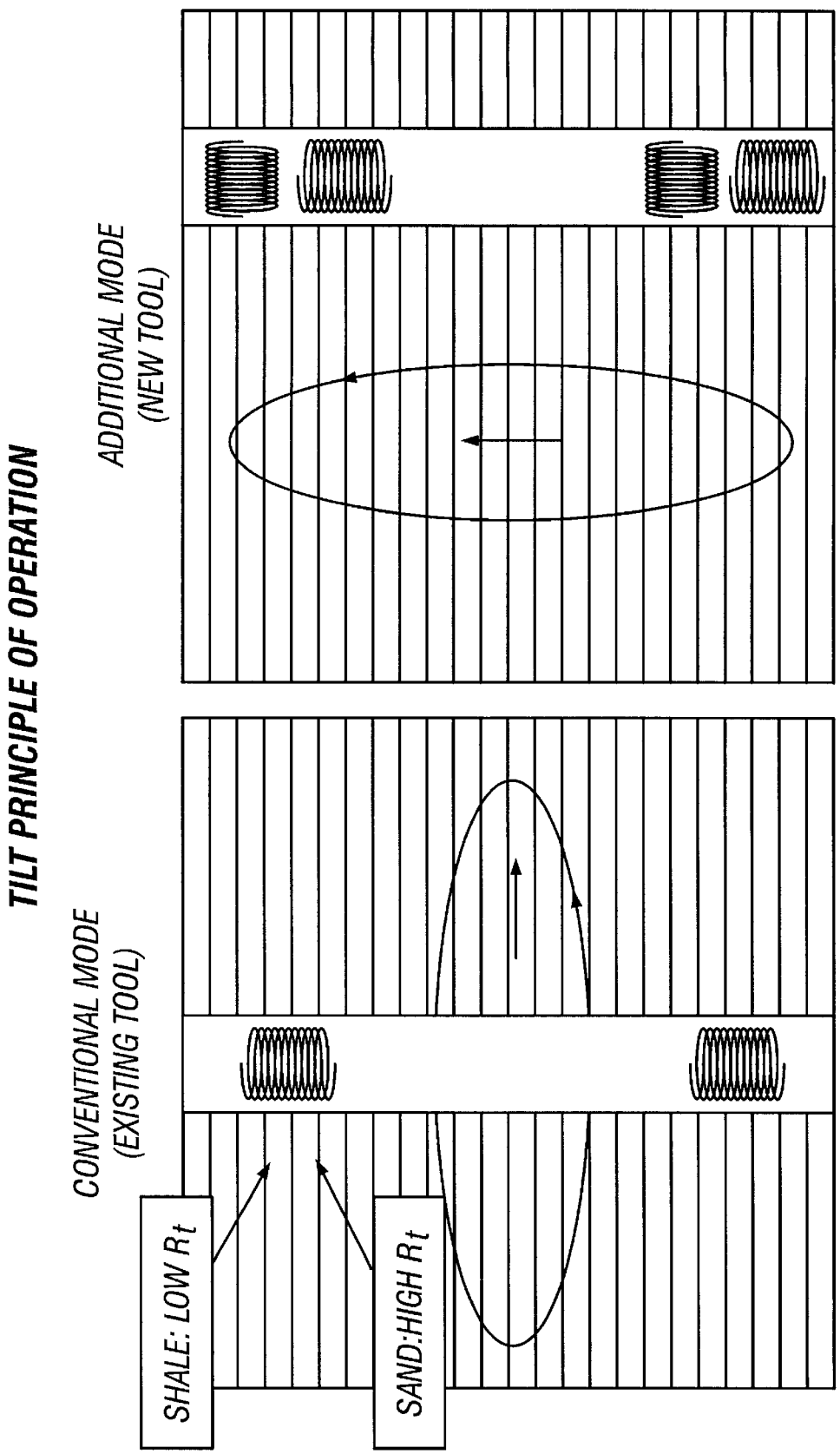
FIG. 2A illustrates a conventional resistivity measurement in the vertical direction.
FIG. 2B illustrates a preferred resistivity measurement in the horizontal direction.

As shown in FIG. 2A, conventional induction logging tools provide a single transmitter and receiver coil that measure resistivity in the horizontal direction. In the conventional horizontal mode, as shown in FIG. 2A, the resistivities of adjacent high resistivity sand and low resistivity shale layers appear in parallel, thus the resistivity measurement is dominated by low resistivity shale. As shown in FIGS. 1 and 2B, in the present invention a transverse coil is added to measure resistivity in the vertical direction. In the vertical direction, the resistivity of the highly resistive sand and low resistivity shale are appear in series and thus the vertical series resistivity measurement is dominated by the resistivity of the highly resistive sand.

For ease of reference, normal operation of the tool 9, as shown in FIGS. 1 and 2B, will be described hereinafter only for the coils having dipole moments in the x-direction, i.e. dipole moments 26a and 28a. During normal operation an alternating current of a frequency $f_1$ is supplied by the electric power supply of surface equipment 22 to transmitter coil set 18 so that a magnetic field with magnetic dipole moment 26a is induced in the formation. In an alternative embodiment, the frequency is swept through a range $f_1$ through $f_2$. This magnetic field extends into the sand layer 3 and induces a number of local eddy currents in the sand layer 3. The magnitude of the local eddy currents is dependent upon their location relative to the transmitter coil set 18, the conductivity of the earth formation at each location, and the frequency at which the transmitter coil set 18 is operating. In principle the local eddy currents act as a source inducing new currents, which again induce further new currents, and so on. The currents induced into the sand layer 3 induces a response magnetic field in the formation, which is not in phase with the transmitted magnetic field, but which induces a response current in receiver coil set 19. The magnitude of the current induced in the sand layer 3 depends on the conductivity of the sand layer 3, the magnitude of the response current in receiver coil set 19. The magnitude also depends on the conductivity and thereby provides an indication of the conductivity of the sand layer 3. However, the magnetic field generated by transmitter coil set 18 not only extends into sand layer 3, but also in the wellbore fluid and in the shale layers 5 and 7 so that currents in the wellbore fluid and the shale layers 5 and 7 are induced.

Figure 3:
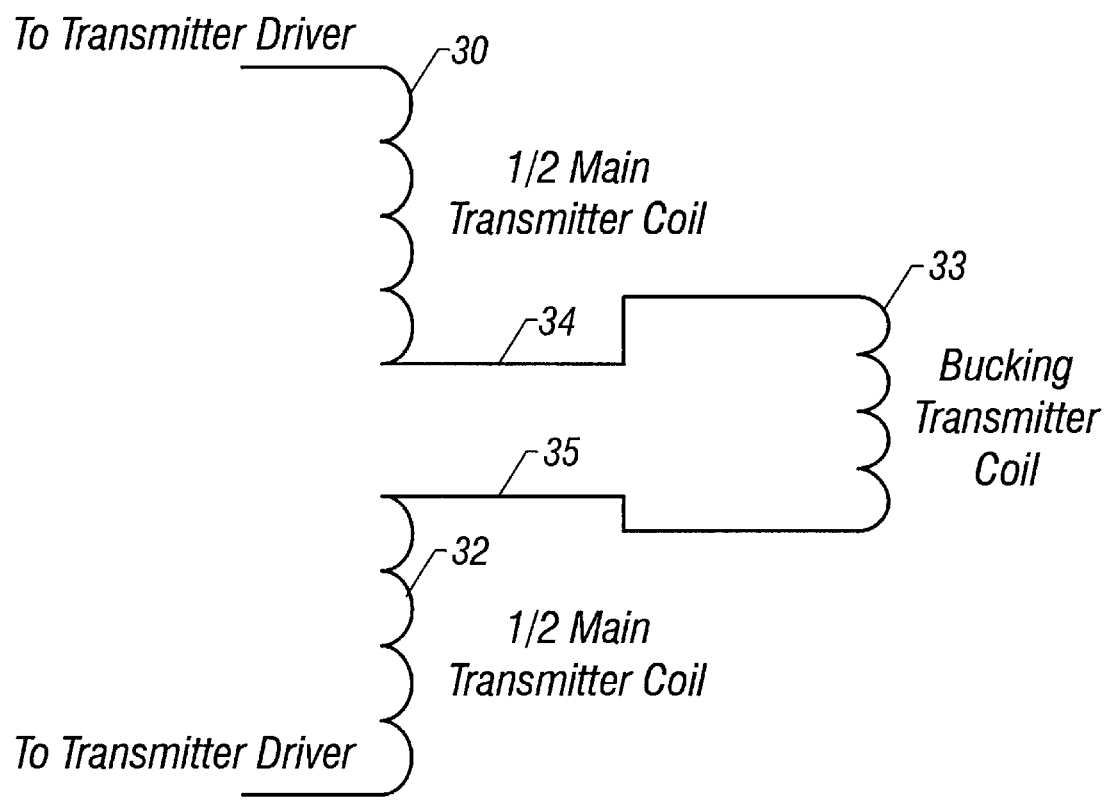
FIG. 3 is a schematic diagram illustrating a preferred embodiment of the split coil transmitter and bucking coil provided by the present invention.

Turning now to FIG. 3, a schematic diagram of the preferred three-coil array structure is depicted, comprising a split-coil transmitter and a bucking coil. As shown in FIG. 3, in a preferred embodiment a symmetrical transmitter-bucking coil wiring is provided instead of the traditional coil wiring. The transmitter coil is equally divided into a first transmitter coil 30 and a second transmitter coil 32. A bucking coil 33 is electrically connected in between the first transmitter coil 30 and the second transmitter coil 32 with bucking coil wire extensions 34 and 35 in between first transmitter coil 30 and a second transmitter coil 32. The same configuration can be utilized for an array whether comprising single or multiple transmitters and differential receivers (see, for example, the Baker Atlas 1507 and 1515 well logging instruments). In a preferred embodiment, a symmetrical wiring is utilized, in a preferred point of symmetry associated with either the center tap of the transmitter coil driver, or with the signal ground of the receiver input pre-amplifier. In both cases, the shielding and routing wire reactances in cables connecting the coils are symmetrical with respect to both coils and the connection point, coming from the shields through routing wires and being already canceled or significantly suppressed at the pre-amplified input. Moreover, this arrangement is less sensitive to the lengthy wires routed along the tool and the diameter and conductivity of a feed through pipe containing the interconnection wiring.

As shown in FIG. 4 the symmetrical shielding of the three-coil array enables minimization of the current return into the transmitter or receiver thereby introducing errors into the collected data samples. The receiver coil 19 is shown within shield 40. Shield 40 is attached to feed through pipe 41 at point 42. Bucking coil 33 is shown within shield 44. Shield 44 is attached to feed through pipe 41 at point 45. Transmitter coil 18 is shown with shield 46. Shield 46 is attached to feed through pipe at point 37. Power amplifier 43 balanced outputs 47 and 48 drive transmitter coil 18.

Figure 5:
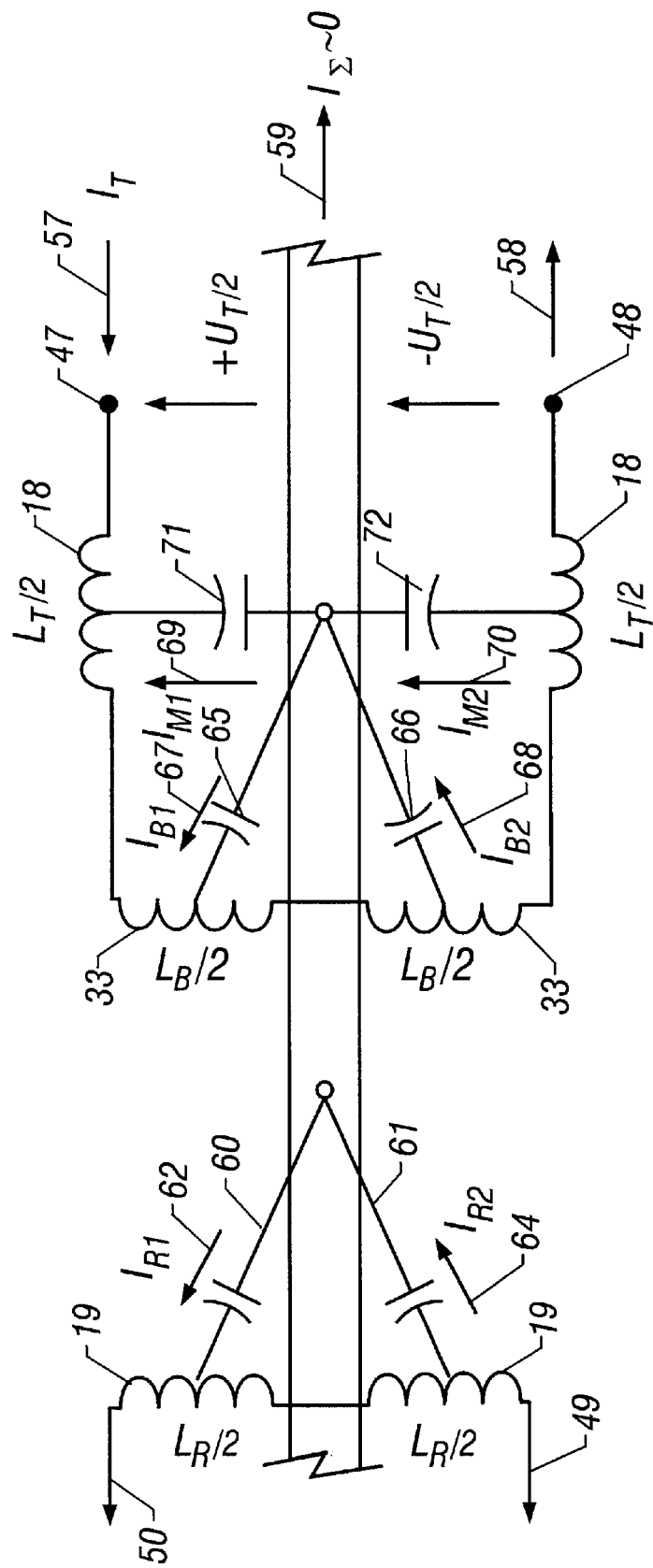
FIG. 5 is a schematic diagram illustrating a preferred embodiment of the current summation and cancellation provided by the present invention.

As shown in FIG. 5, the return current, $I_\Sigma$ sums to approximately zero in the preferred embodiment of the invention. As shown in FIG. 4, the receiver stray capacitance associated with the receiver coil, the receiver proximate feed through pipe, and the receiver wiring stray capacitance is represented by capacitors 60 and 61. The current flowing in association with the receiver stray capacitance is represented by currents $I_{R1}$ 62 and $I_{R2}$ 64 respectively. The bucking stray capacitance associated with the bucking coil, the bucking coil proximate feed through pipe, the wiring and other sources of stray capacitance is represented by capacitors 65 and 66. The current flowing in association with the bucking coil stray capacitance is represented by currents $I_{B1}$ 67 and $I_{B2}$ 68 respectively.

The main transmitter stray capacitance associated with the main transmitter coil, the main transmitter proximate feed through pipe, and the main transmitter wiring stray capacitance is represented by capacitors 71 and 72. The current flowing in association with the transmitter stray capacitance is represented by currents $I_{M1}$ 69 and $I_{M2}$ 70 respectively. The sensor construction structure of the present invention provides cancellation for a summation current $I_\Sigma$ of approximately zero, thereby reducing the error attributable to the induced current induction problem.

Figure 6A:
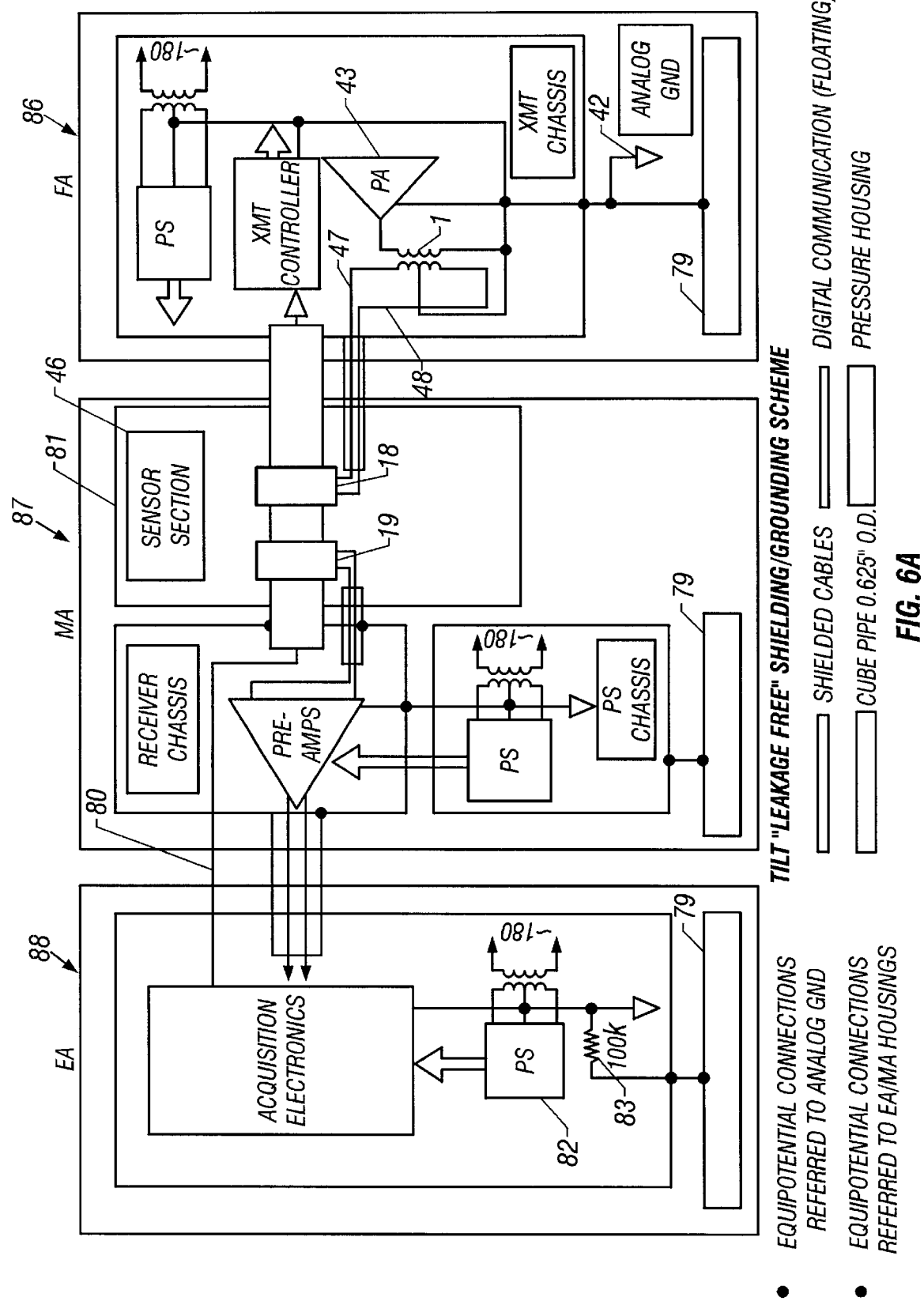
FIG. 6A is a schematic diagram illustrating a preferred embodiment of the shielding and grounding structure provided by the present invention.
Figure 6B:
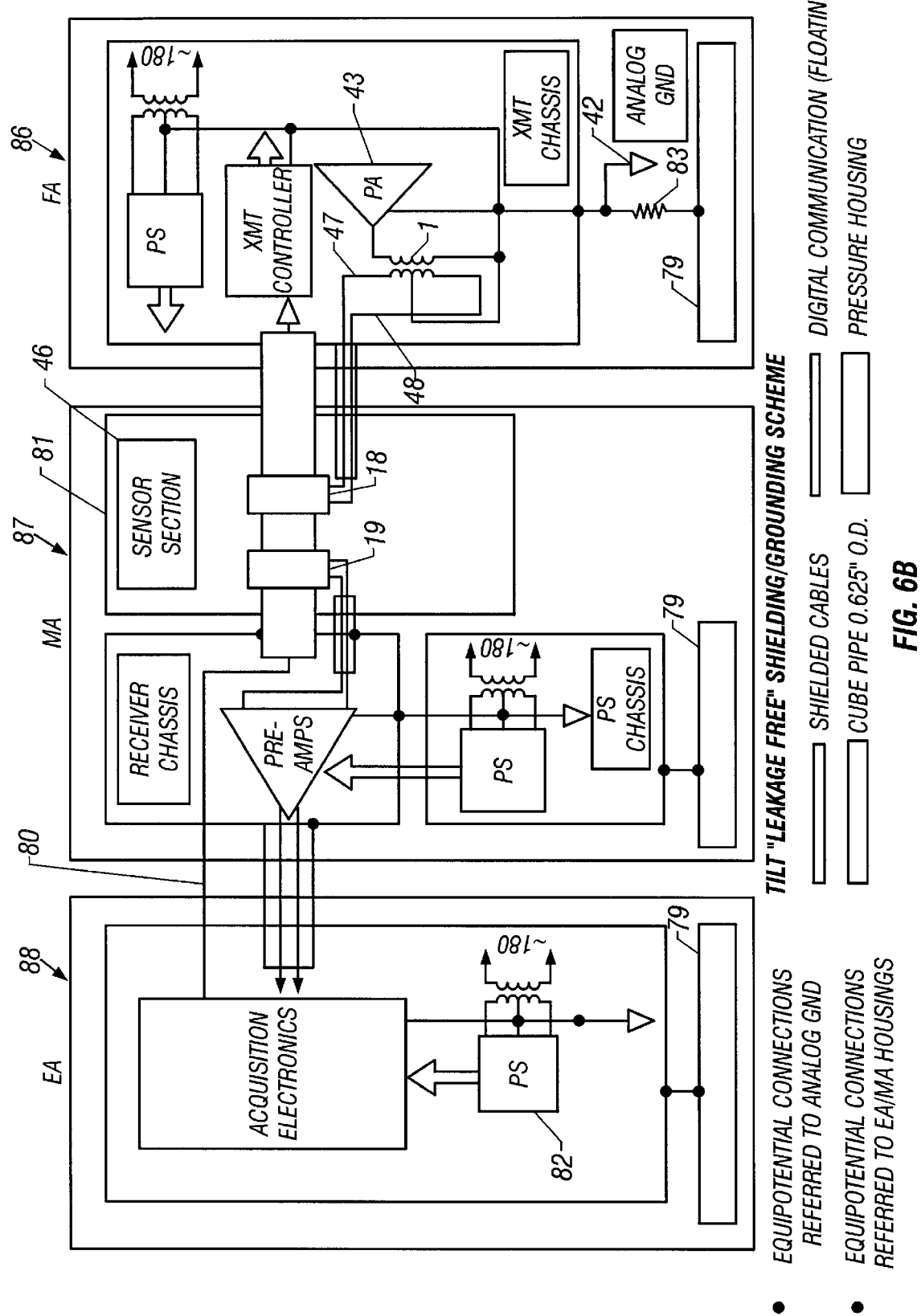
FIG. 6B is a schematic diagram illustrating an alternative embodiment of the shielding and grounding structure provided by the present invention.
Figure 6C:
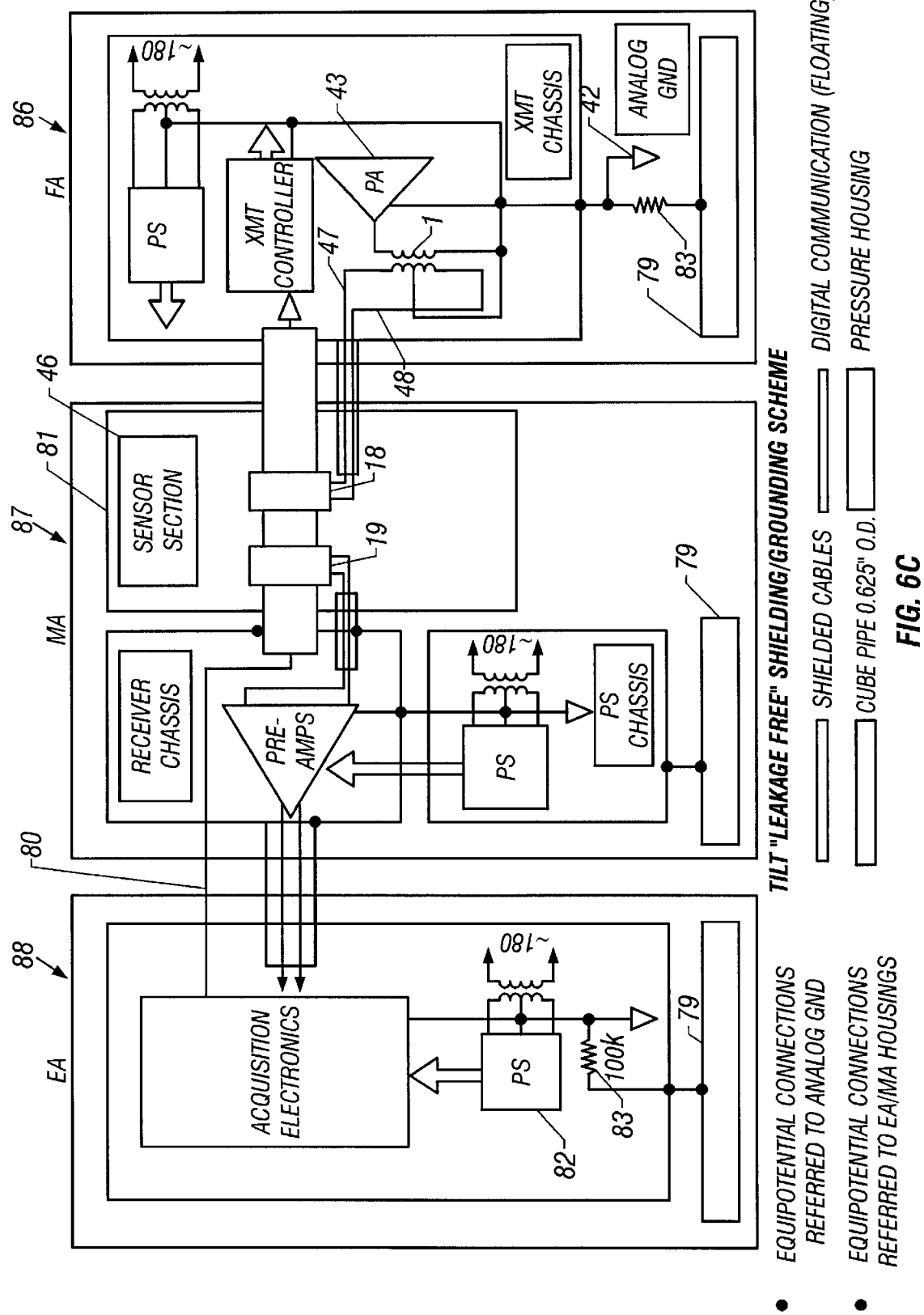
FIG. 6C is a schematic diagram illustrating an alternative embodiment of the shielding an grounding structure provided by the present invention.
Figure 10:
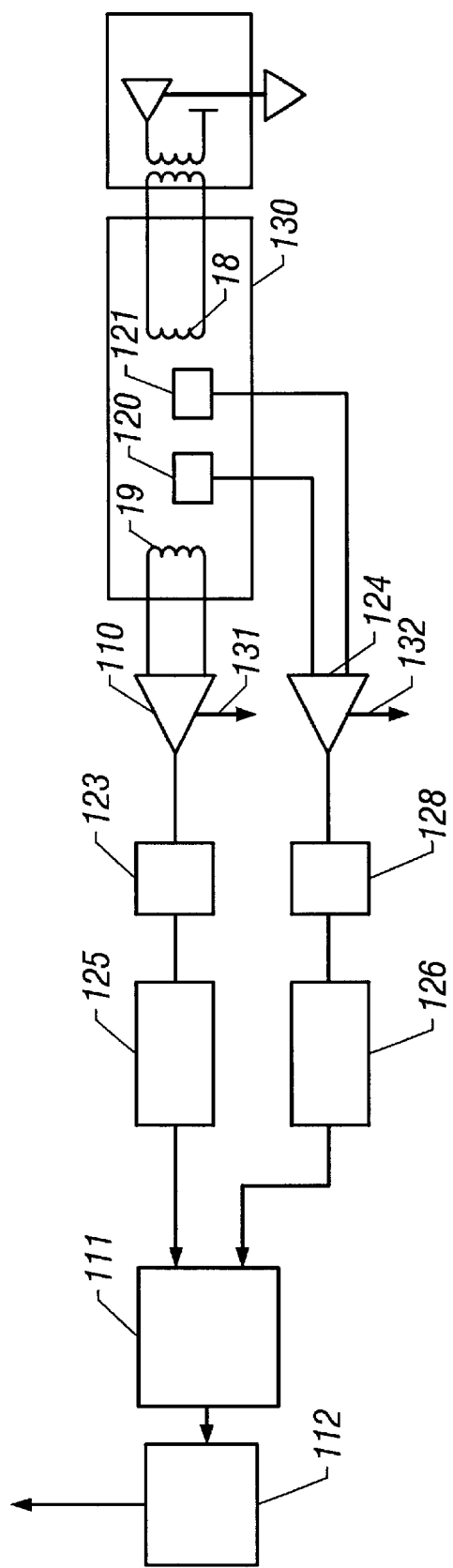
FIG. 10 illustrates an alternative embodiment of the invention comprising the induction tool along with a galvanic electrode pair on the same mandrel.

Turning now to FIG. 6A, a schematic representation of a preferred embodiment of the shielding, grounding and isolation scheme of the present invention is illustrated. In a preferred embodiment the receiver 19 electronics is electrically isolated and insulated from the conductive pressure housing 79. The exterior of the conductive pressure housing is in contact with the conductive wellbore fluid. Electrical isolation of the receiver interrupts the induction current loop and substantially reduces the error induced into the receiver signal caused by induction currents flowing in conventional systems. In a preferred embodiment the analog ground for the main transmitter section 86 is connected to the conductive pressure housing 79 comprising, for example, CuBe pipe. The analog ground for the acquisition receiver electronics is preferably separated from the conductive pressure housing 79 by a high impedance in the operating frequency range, for example a 100 kOhm resistor 83 or capacitor. This impedance, however, is preferably controlled to maximally reduce induced currents and associated errors. In an alternative embodiment, as shown in FIG. 6B, the receiver electronics electrical ground is isolated by controlled high impedance from the conductive pressure housing and the transmitter electronics ground is electrically connected to the pressure housing. In another alternative embodiment, as shown in FIG. 6C, both the receiver and transmitter electronics are electronically isolated by high impedance from the conductive pressure housing. In another embodiment, as shown in FIG. 10, a galvanic electrode and a current source are provided on the same mandrel and which are electrically isolated from the induction transmitter and receiver.

Turning now to FIG. 7, an illustration of the settling time due to transient response 91 required during conventional frequency switching is depicted. Turning now to FIG. 8, in a preferred embodiment, a sweeping frequency oscillator is provided that reduces transient response 91 and therefore requires substantially less settling time, thereby providing more time for data acquisition and stacking of more data samples.

The conventional tool arrangement does not have to be reconfigured to accommodate the sweep oscillator as the majority of the electrical connections remain the same, including the synchronization loop and associated circuitry. Sweeping the transmission frequency does not prohibit dual frequency measurements as used in transverse induction logging instruments, in part due to the practical absence of transient time switched processes in the electronics. The absence of transients is useful in applications where an extremely short time is available for generation and measurement of each frequency-pair signals.

Figure 9:
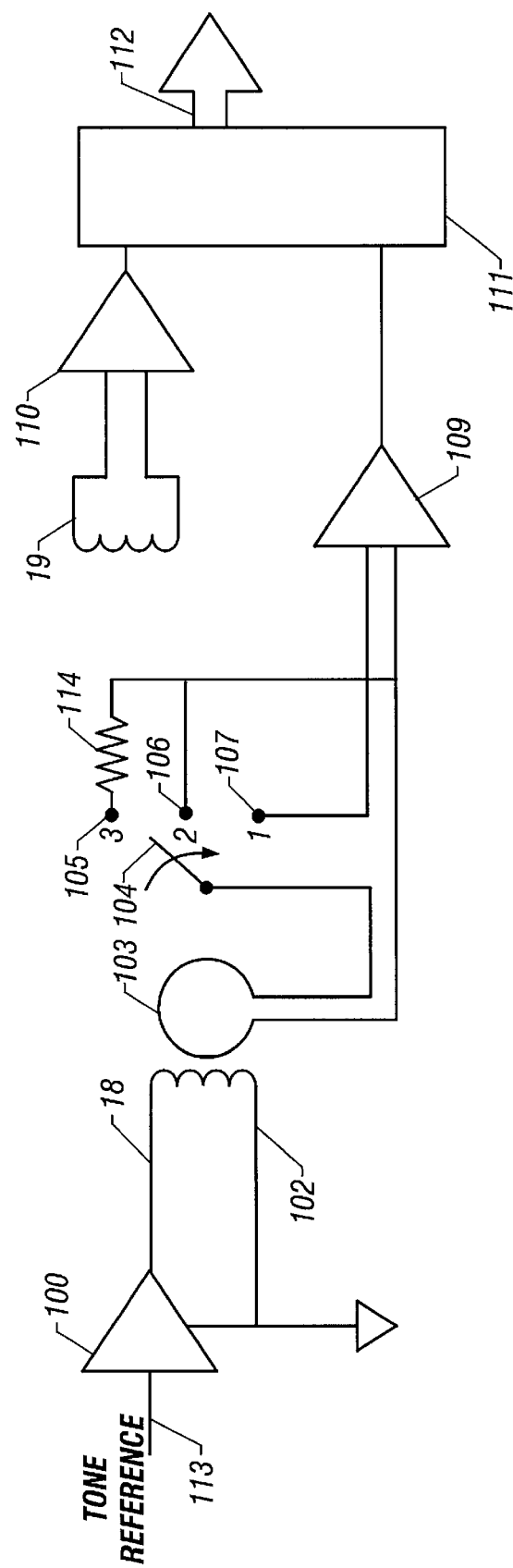
FIG. 9 is schematic representation of a preferred sensor stability verification loop is illustrated.

Turning now to FIG. 9, a schematic representation of a preferred sensor stability verification loop is illustrated. As shown in FIG. 9, power amplifier 100 accepts verification tone reference signal 113 as input to the transmitter coil set 18 (coil set 18 comprising x, y and z-axis coils shown having magnetic dipole moments 26a, 26b and 26c as shown in FIG. 1). When the switch 104 is in a first position and connected to node 107, the tone is coupled to the transmitter coils is reference loop 103 which senses the level of the transmitted field from transmitter coil set and sends the received signal to the transmitter reference channel 109 which is sent to processor 111 and subsequently sent to surface via telemetry 112. During logging, the reference signal is recorded to track changes in the transmitter current enabling subsequent removal of the effects of changes in the transmitter current on the received signal during logging.

In a third position, switch 104 connects with node 105 wherein the signal goes through element 114 having a variable phase shifting impedance which couples the signal from the transmitter coil 101 through loop 103 into the receiver coil set 19 (coil set 19 comprising x, y and z-axis coils shown having magnetic dipole moments 28a, 28b and 28c as shown in FIG. 1). Element 114 can be selected to induce a desired phase angle shift into the signal in order to measure both quadrature and real component of the signal where phase reference is with respect to the transmitter magnetic field. In a second position, switch 104 is connected without the loss element, thus there is no loss so that the lossy and non-lossy signals can be compared. This structure enables collection of quadrature sensor stability verification data for comparison to the quadrature component of the logging data. The quadrature data is significant because it is less affected by the bore hole effects. Thus the quadrature verification signal can be used to remove errors and effects in the quadrature signal to enable more accuracy in the in-phase and out of phase data acquired during logging.

K is the ratio of the number of turns in reference coil 103 winding $M_B$ to the number of turns $M_T$ in the transmitter coils 101 is small, for example 1/34. The voltage on the single loop 103 $V_B$ is the voltage in the transmitter coil 103 $V_T/K$. The reflected impedance $Z_{load-reflected}$ due to the single coil calibration loop 103 is equal to $(K^2)(Z_B)$ where $Z_B$ is the impedance of the single loop 103. The total transmitter impedance is equal to $Z_T + Z_{load-reflected}$. K is 1/34 in a preferred embodiment, therefore $K^2$ is small causing $Z_{load-reflected}$ to be small. Thus, the inductance on the transmitter does not change appreciably when switching between the first, second and third positions.

Turning now to FIG. 10, illustrates an alternative embodiment of the invention comprising the induction tool along with a galvanic electrode and current source on the same mandrel with the induction transmitter 18 and receiver 19. As shown in FIG. 10 galvanic electrodes 120 and 121 are housed on mandrel 130 along with induction transmitter 18 and induction receiver 19. In this configuration the galvanic electrodes 120 and 121 perform lateral or differential measurements. The galvanic frequency range is preferably 1 Hz to 1 kHz, but not exclusive of other frequency ranges which are acceptable. The induction frequency range is from 1 kH to 5 Mz, but not exclusive of other frequency ranges which are acceptable. Preamp 110 has ground 131 and provides an output signal to an analog to digital converter 123 which is electrically isolated from main controller 111 by capacitive and galvanic isolator 125. Preamp 124 has ground 132 and provides an output signal to an analog to digital converter 128 which is isolated from main controller 111 by capacitive and galvanic isolator 126. In a preferred embodiment, ground 131 and 132 are isolated from the pressure housing. In an alternative embodiment ground 131 is electrically connected to the pressure housing and ground 132 is isolated from the main housing. In an alternative embodiment ground 132 is electrically connected to the main pressure housing and ground 131 is isolated from the main housing.

Figure 11:
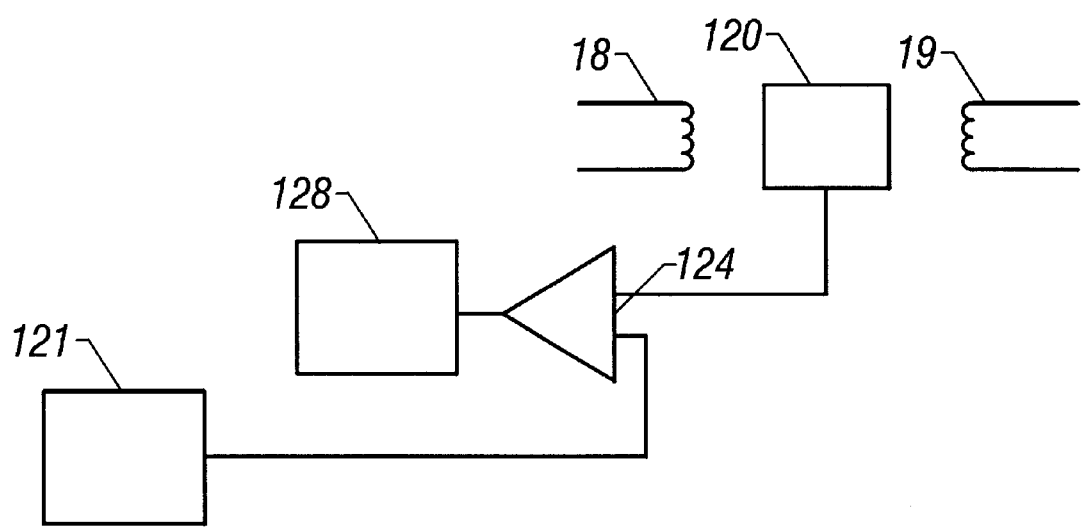
FIG. 11, illustrates an alternative embodiment of the invention comprising the induction too along with a single galvanic electrode on the same mandrel.

Turning now to FIG. 11, an alternative embodiment of the invention is shown wherein galvanic electrode 120 is located on the mandrel with the induction tool and galvanic electrode 121 is located at infinity with respect galvanic electrode 120, to facilitate performing normal galvanic measurements.

What is claimed is:

1. An induction tool for measuring the properties of a geological formation adjacent a bore hole comprising:
   - a tool body for traversing a bore hole formed in a geological formation;
   - a transmitter coil wound on a single form and housed in the tool body for transmitting an electromagnetic field into the geological formation the transmitter coil further comprising a coil electrically split into coil winding sections with an equal number of windings symmetric with respect to a tool longitudinal axis, each coil winding section wound in same angular direction with respect to the coil axis; a feed through conductive pipe carrying current and conductors in a hollow center between circuitry above and below an induction tool body surrounding coils, conductors connecting the sections of the electrically split transmitter coil, conductors connecting the receiver and transmitter coils to the respective receiver and transmitter circuitry routed outside the feed through conductive pipe or in the feed through pipe hollow center; and
   - a receiver coil for sensing magnetic fields induced in the formation by the transmitted magnetic field.

2. The apparatus of claim 1, wherein the transmitter coil further comprises symmetrical coil sections wound symmetrically with respect to the current carrying feed through pipe and conductors routed along the tool axis, so that magnetic fields generated by each of the coil's symmetric sections will induce eddy currents on these conductors and on the external surface of the feed through pipe in areas projected above and below a coil winding area.

3. The apparatus of claim 2, wherein the transmitter coil further comprises a bucking coil electrically interposed between the transmitter coil sections to provide symmetry of the transmitter coil sections with respect the feed through pipe.

4. The apparatus of claim 3 further comprising an electrically symmetrical shield on each transmitter section to provide an electrical symmetry between the transmitter coil sections and the respective shields to provide capacitive coupling between each section of the shield to the feed-through pipe for minimizing parasitic currents on the surface of the feed-through pipe, minimize the overall return current and minimize magnetic interference with the receiver coil.

5. The apparatus of claim 4 further comprising an electrically symmetrical bucking coil shield in order that a capacitance between the bucking coil shield return current terminal and each lead connecting the bucking coil shield are the same providing symmetry with respect to the feed-through pipe.

6. The apparatus of claim 1 further comprising:
   - an insulator for interrupting a current path for galvanic currents flowing in the tool body.

7. An apparatus for reducing undesirable currents flowing in an induction tool for measuring the properties of a geological formation adjacent a bore hole comprising:
   - a tool body for traversing a bore hole formed in a geological formation;
   - a transmitter coil wound on a single form and housed in the induction tool body for transmitting an electromagnetic field into the geological formation further comprising a split coil electrically split into sections with equal windings;
   - a feed through current carrying conductive pipe and conductors running between the sections of the electrically split transmitter coil, the conductive feed though pipe housing electrical conductors; and
   - a receiver coil for sensing electromagnetic fields induced in the formation by the transmitted magnetic field.

8. The apparatus of claim 7, wherein the transmitter comprises symmetrical coil sections wound symmetrically with respect to the conductive feed through pipe and conductors, so that electromagnetic fields from each of the transmitter coil sections induces eddy currents on the conductors which are localized inside of the transmitter coil winding sections and negate each other outside of the current carrying feed through pipe.

9. The apparatus of claim 8, wherein the transmitter further comprises a bucking coil electrically interposed between the transmitter coil sections to provide symmetry of the transmitter coil sections with respect to the feed through pipe.

10. The apparatus of claim 9, further comprising:
    - an electrically symmetrical shield on each transmitter coil section in order to provide an electrical symmetry between the transmitter coil sections and the respective shields to provide capacitive coupling between each section of the shield to the feed-through pipe for minimizing parasitic currents on the surface of the feed-through pipe, minimize the overall return current and minimize magnetic interference with the receiver coil.

11. The apparatus of claim 10 further comprising an electrically symmetrical bucking coil shield in order that a capacitance between the bucking coil shield return current terminal and each lead connecting the bucking coil shield are the same providing symmetry with respect to the feed-through pipe.

12. The apparatus of claim 10 further comprising:
    - a ground connected to the transmitter shield also connected to coil shields on mandrel.

13. The apparatus of claim 8 wherein the receiver floating and not connected to ground.

14. The apparatus of claim 7 further comprising:
    - a controlled impedance isolating a transmitter electrical ground from a receiver
    - electrical ground for reducing current flow between the transmitter and the receiver.

15. The apparatus of claim 7 further comprising:
    - an electrical insulator for insulating the receiver from the well bore.

16. The apparatus of claim 7 further comprising:
    - an electrical insulator for insulating the receiver from the receiver from the feed through pipe.

17. The apparatus of claim 7 further comprising:
    - an insulator for insulating the receiver from the feed-through pipe.

18. The apparatus of claim 7 further comprising:
    - a transverse transmitter coil; and
    - a transverse receiver coil.

19. A logging tool for measuring the properties of a geological formation adjacent a bore hole comprising:
    - a tool body for traversing a bore hole formed in a geological formation;

a receiver coil wound on a single form and housed in the tool body for sensing a magnetic field from the geological formation further comprising a coil electrically split into coil winding sections with an equal number of windings symmetric with respect to a tool's longitudinal axis, each coil winding section wound in a same angular direction with respect to a coil axis; a feed through conductive pipe carrying current and conductors in a hollow center between circuitry above and below an induction tool body surrounding coils, further comprising conductors connecting the sections of the receiver coil, conductors connecting receiver and transmitter coils to a respective receiver and transmitter circuitry routed outside the feed through conductive pipe or a feed through pipe hollow center; and a transmitter coil for transmitting electromagnetic fields into the formation.

* * * * *